3,061,588
HARDENABLE RESIN MIXTURES
Wolfgang Griehl and Hans Lückert, Chur, Switzerland, assignors to Inventa A.G. fuer Forschung und Patentverwertung, Zurich, Switzerland
No Drawing. Filed Nov. 18, 1959, Ser. No. 853,690
Claims priority, application Switzerland Nov. 20, 1958
2 Claims. (Cl. 260—47)

The invention relates to novel thermosetting synthetic resins and, more particularly, to epoxy resins.

It is known that thermosetting epoxy ether mixtures consist of compounds having two phenolic hydroxyl groups in the molecule combined with epichlorohydrin. Compounds having two phenolic hydroxyl groups are, e.g., mononuclear bivalent phenols such as pyrocatechol, or polynuclear phenols, such as 2.2-bis-(4-oxyphenyl)-propane (Bisphenol A), 4.4'-dioxybenzophenone, 1.1-bis-(4-oxyphenyl)-ethane, 1.1-bis-(4-oxyphenyl)-isobutane, 2.2-bis-(4-oxy-2-methylphenyl)-propane, bis-(2-oxynaphthyl)-methane, 4.4'-dioxydiphenyl sulfone, etc. However, in practice almost exclusively Bisphenol A is employed because of its plentiful supply and of its favorable properties.

It now has been found that 1,2-bis-(4-hydroxy-3-methoxy phenyl) ethane forms novel hardening epoxy ether mixtures with epichlorohydrin which, after fabrication, yield synthetic resins of superior properties. The compound which has the following Formula 1:

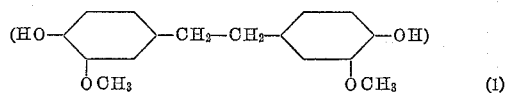

is also known as bisvanillyl and can easily be made from vanillin.

The synthetic resins thus produced have especially good properties because of the methoxy groups bound to the aromatic nuclei of the bisvanillyl in that moldings, coatings, laminates, adhesives or varnishes made therefrom are extremely elastic, their high tensile strength notwithstanding.

The chemical structure of these novel resinous epoxy ethers is expressed by the general structural Formula 2:

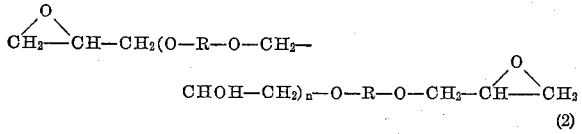

whreby $n$ denotes numbers 1, 2, 3, etc., and R denotes the bisvanillyl radical. Since a mixture of polymer-homolog compounds is present, $n$ is merely an average value. The latter can be influenced by varying the ratio of epichlorohydrin to bisvanillyl. If the quantity of epichlorohydrin is lowered, the molecular weight of the synthetic resin formed is increased. Simultaneously, its softening point rises. For instance, a resin mixture having a molar ratio of epichlorohydrin to bisvanillyl of 1:2.15 has a softening point of 34° C., one having a mol ratio of 1:1.33 softens at 51° C.

The softening points of resins whose $n$ is less than 1 (cf. Formula 2), are, as an average, 40–50° C. lower than the corresponding resins made with Bisphenol A. This is of considerable technological importance for the fabrication of the resins.

To set the resins according to the invention, they are mixed with cross-linking agents and, if desired, with catalysts and then are subjected to heat. The terms "setting" or "hardening" are meant to denote a chemical process which is a transition from the soluble and fusible state into an insoluble and infusible state. Mixing of the components can be carried out warm or in the presence of solvents. In the latter case, lacquers are obtained upon heating which are ready for use and which yield elastic coatings.

The cross-linking agents and the epoxy ethers can be used in greatly varying weight proportions. However, it is preferred to mix the epoxy-containing condensation products with such quantities of cross-linking agent that per epoxy group one active hydrogen atom in the active groups is available or that, e.g., one anhydride group is present for each epoxy group.

Particularly suitable cross-linking agents are acid anhydrides, polyacid anhydrides, diamines, polyamines, polyesters, carboxylic acids, isocyanates, phenols and reactive urea- and melamine-formaldehyde resins, and others. Basic and acidic catalysts can be employed. Nitrogen-containing substances, such as amides or amines, and also boron trifluoride have proven especially suitable. Some compounds simultaneously act as cross-linking agents and as catalysts, for instance triethylene tetramine.

The invention now will be more fully described by means of the following example. However, it should be understood that this is given merely by way of explanation, not of limitation, and that numerous changes may be made in the details without departing from the spirit and the scope of the invention as hereinafter claimed.

EXAMPLE

For the production of the resin mixtures, 17.5 kg. bisvanillyl are dissolved by warming in 80 liters 5 percent NaOH in a reactor equipped with an efficient agitator.

When the temperature reaches 60° C., 7.1 kg. epichlorohydrin are entered gradually. The temperature is raised within one hour with agitation to boiling temperature and is held thereat for one hour. The supernatant fluid then is decanted, and the light-colored resin mixture is boiled out repeatedly with fresh water until the latter no longer reacts alkaline. The resin then is freed from water on a roller mill, followed by heating for as short a time as possible at 150° C.

The glycidyl ether mixture thus formed has a softening point of 64° C. Its epoxy content is 0.7 epoxy equivalents per kg.

The following Table 1 shows the properties of a number of resin mixtures.

Table 1

| Bisvanillyl, kg. | Epichlorohydrin, kg. | NaOH (5 Percent) l. | Soft. Pt., ° C. | Epoxy-equivalents per kg. |
|---|---|---|---|---|
| 27.4 | 19.9 | 190 | 34 | 3.0 |
| 27.4 | 13.0 | 146 | 45 | 1.5 |
| 27.4 | 12.3 | 139 | 51 | 1.2 |
| 27.4 | 11.1 | 125 | 64 | 0.7 |

We claim as our invention:
1. Thermosetting resins, consisting of a reaction product of 1,2-bis-(4-hydroxy, 3-methoxyphenyl)-ethane with epichlorohydrin in the presence of alkalies and in proportions ranging from 2.15:1 to 1.33:1.
2. A process for the production of thermosetting resins, which comprises reacting 1,2-bis-(4-hydroxy, 3-methoxyphenyl)-ethane with epichlorohydrin in the presence of alkalies and in proportions ranging from 2.5:1 to 1.33:1.

References Cited in the file of this patent
UNITED STATES PATENTS

| | | |
|---|---|---|
| 2,602,075 | Carpenter et al. | July 1, 1952 |
| 2,615,008 | Greenlee | Oct. 21, 1952 |